US007200003B2

(12) United States Patent
Hood et al.

(10) Patent No.: US 7,200,003 B2
(45) Date of Patent: Apr. 3, 2007

(54) METHOD AND APPARATUS FOR MOUNTING A DRIVE IN A CHASSIS

(75) Inventors: Charles D. Hood, Cedar Park, TX (US); Robert D. Hrehor, Jr., Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 172 days.

(21) Appl. No.: 11/021,430

(22) Filed: Dec. 23, 2004

(65) Prior Publication Data

US 2006/0139868 A1    Jun. 29, 2006

(51) Int. Cl.
*G06F 1/16* (2006.01)
(52) U.S. Cl. .................... 361/685; 312/223.1
(58) Field of Classification Search ........... 361/685, 361/726; 312/223.1, 223.2
See application file for complete search history.

(56) References Cited

U.S. PATENT DOCUMENTS

| 5,513,068 | A | * | 4/1996 | Girard ................ 361/685 |
| 5,748,442 | A | * | 5/1998 | Toor .................. 361/685 |
| 6,075,694 | A | * | 6/2000 | Mills et al. ........... 361/685 |
| 6,122,173 | A | | 9/2000 | Felcman et al. |
| 6,362,955 | B2 | * | 3/2002 | Felcman et al. ........ 361/685 |
| 6,580,604 | B1 | * | 6/2003 | McAnally et al. ...... 361/685 |
| 6,618,247 | B2 | | 9/2003 | Felcman et al. |

* cited by examiner

*Primary Examiner*—Lisa Lea-Edmonds
(74) *Attorney, Agent, or Firm*—Haynes and Boone, LLP

(57) ABSTRACT

A drive mounting apparatus includes a drive chassis, a first support wall on the drive chassis including a first support structure and a second support wall on the drive chassis substantially transverse to the first support wall and including a second support structure. A repositionable third support wall including a third support structure is operable to be coupled to the drive chassis in a first position opposite the first support wall to provide support between the first support structure and the third support structure, and the third support wall is operable to be repositioned on the drive chassis and coupled to the drive chassis in a second position opposite the second support wall to provide support between the second support structure and the third support structure. A drive may be supported in the drive chassis by the first support structure and the third support structure when the third support wall is in the first position, and the drive may be reconfigured by substantially ninety degrees in the drive chassis and supported by the second support structure and the third support structure when the third support wall is in the second position.

23 Claims, 18 Drawing Sheets

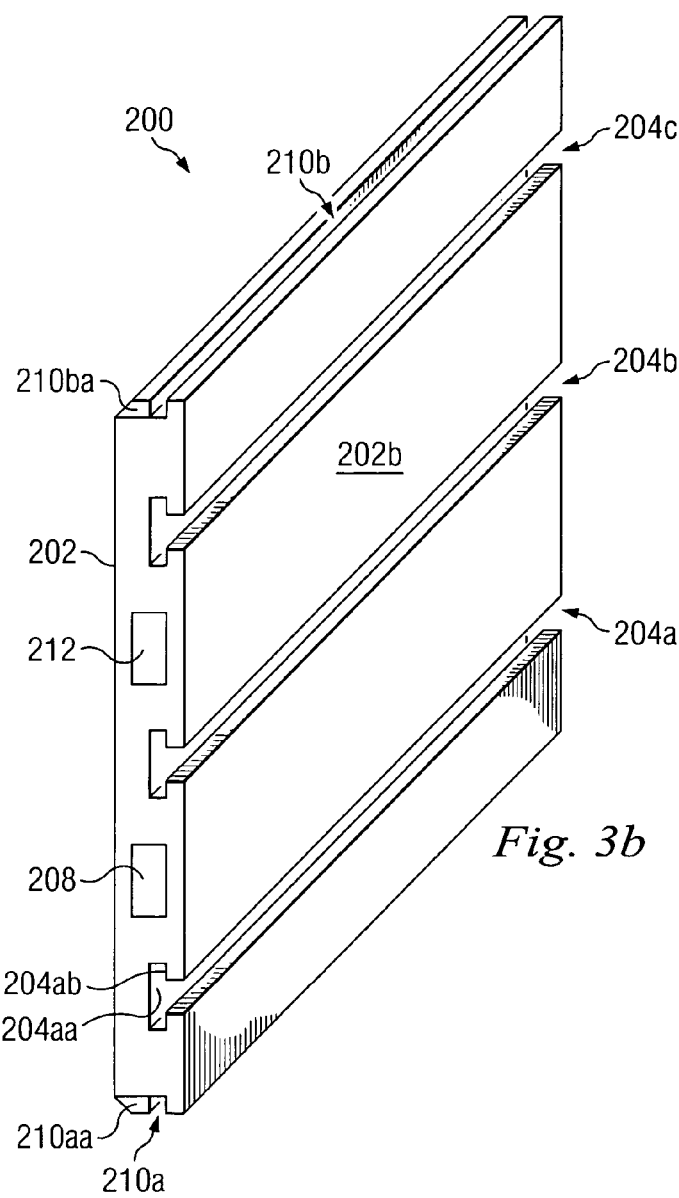
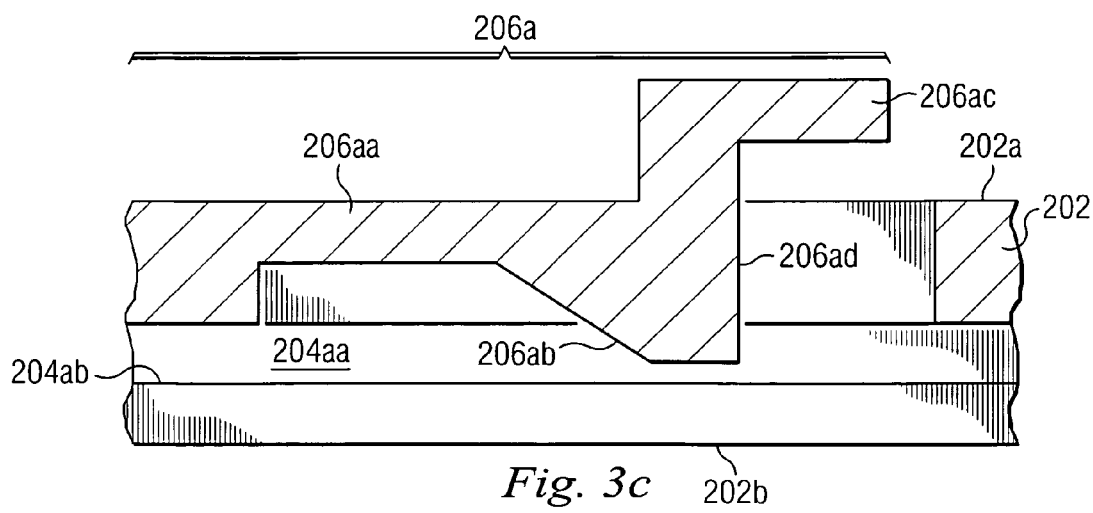
Fig. 3b
Fig. 3c

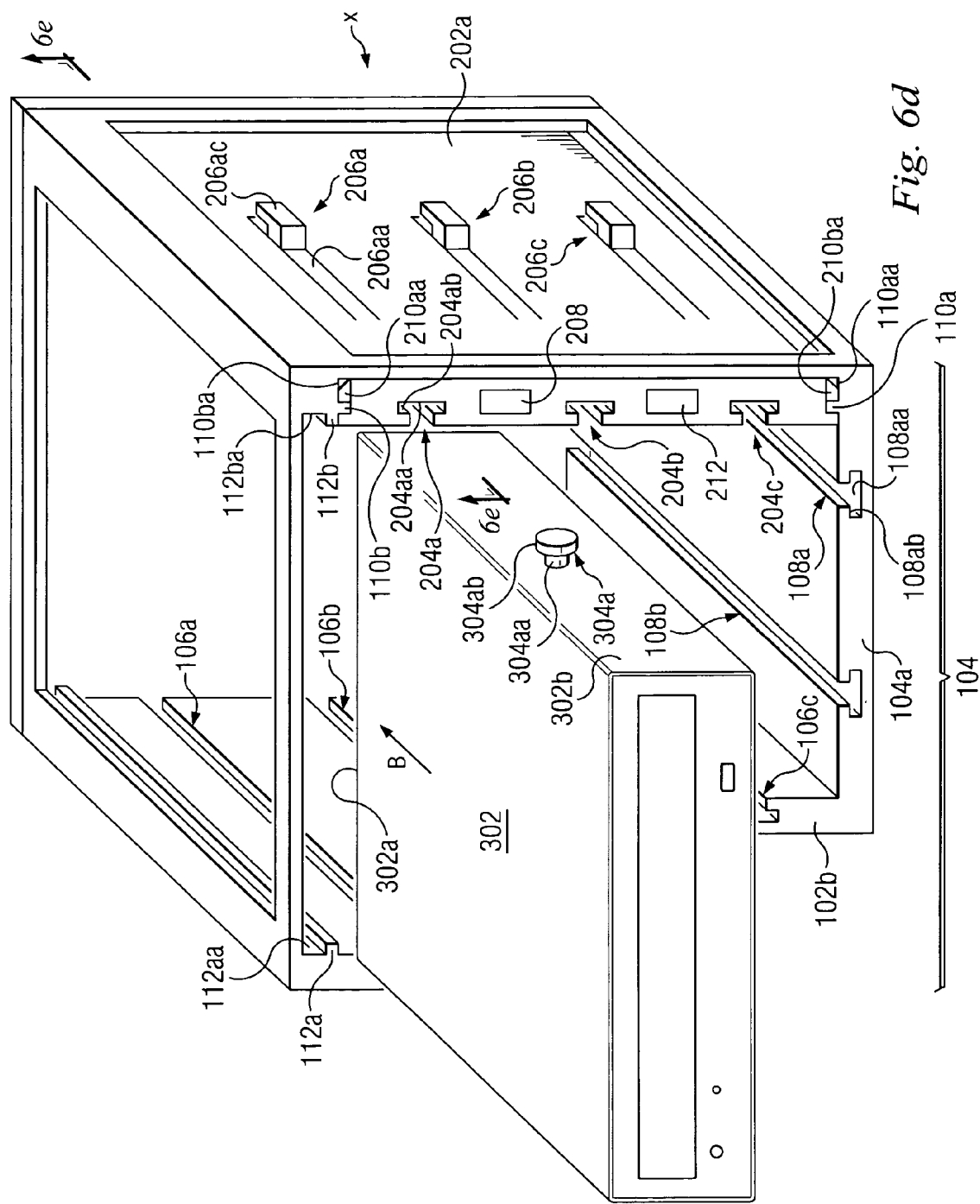

METHOD AND APPARATUS FOR MOUNTING A DRIVE IN A CHASSIS

BACKGROUND

The present disclosure relates generally to information handling systems, and more particularly to a method and apparatus for mounting a drive in a chassis.

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems include a chassis which may hold many of the components of the information handling system such as, for example, optical or floppy drives. A typical chassis may be positioned in either a horizontal or vertical configuration depending on the user's space availability. Whether the chassis is positioned in the horizontal or vertical configuration, it is desirable to position the drives horizontally for ease of use.

The drives may be mounted to the chassis such that they are positioned horizontally either when the chassis is in the horizontal position or when the chassis is in the vertical position. The user must then choose a system drive configuration which fits their space availability. However, the users space availability may change over the lifetime of the system, which can result in the relatively costly and time consuming process of recogfiguration of the drives.

Accordingly, it would be desirable to provide a method and apparatus for mounting a drive in a chassis absent the disadvantages found in the prior methods discussed above.

SUMMARY

According to one embodiment, a vertical and horizontal drive mounting system is provided including a chassis, a wall member movably mounted in the chassis in multiple positions and first and second orientations, a variety of drive units being mounted in the chassis in the first orientation in response to the wall member being mounted in the first orientation, and the variety of drive units being mounted in the chassis in the second orientation in response to the wall member being mounted in the second orientation.

A principal advantage of this embodiment is that drives in the information handling system chassis may be easily repositioned in the chassis when the chassis configuration is switched between horizontal and vertical.

BRIEF DESCRIPTION OF THE DRAWINGS

FIG. 3b is a bottom perspective view illustrating an embodiment of the third support wall of FIG. 3a.

FIG. 3c is a cross sectional view taken along line 3c in FIG. 3a illustrating an embodiment of a securing member on the third support wall of FIG. 3a FIG. 4a is a side perspective view illustrating an embodiment of an optical drive used with the drive chassis of FIG. 2 and the third support wall of FIG. 3a.

FIG. 4b is a side perspective view illustrating an embodiment of the optical drive of FIG. 4a.

FIG. 5a is a side perspective view illustrating an embodiment of a floppy drive used with the drive chassis of FIG. 2 and the third support wall of FIG. 3a.

FIG. 6b is a perspective view illustrating an embodiment of the third support wall of FIG. 3a positioned in the drive chassis of FIG. 2 in the method of FIG. 6a.

FIG. 6c is a perspective view illustrating an embodiment of the third support wall of FIG. 3a coupled to the drive chassis of FIG. 2 in the method of FIG. 6a.

FIG. 6d is a perspective view illustrating an embodiment of the optical drive of FIG. 4a positioned adjacent the drive chassis and third support wall of FIG. 6c in the method of FIG. 6a.

FIG. 6e is a cross sectional view taken along line 6e in FIG. 6d illustrating an embodiment of the optical drive of FIG. 4a being coupled to the drive chassis and third support wall of FIG. 6c in the method of FIG. 6a.

FIG. 6f is a cross sectional view taken along line 6e in FIG. 6d illustrating an embodiment of the optical drive of FIG. 4a being coupled to the drive chassis and third support wall of FIG. 6c in the method of FIG. 6a.

FIG. 6g is a cross sectional view taken along line 6e in FIG. 6d illustrating an embodiment of the optical drive of FIG. 4a coupled to the drive chassis and third support wall of FIG. 6c in the method of FIG. 6a.

FIG. 6h is a perspective view illustrating an embodiment of the optical drive of FIG. 4a coupled to the drive chassis and third support wall of FIG. 6c in the method of FIG. 6a in the method of FIG. 6a.

FIG. 6i is a perspective view illustrating an embodiment of a plurality of the optical drives of FIG. 4a and the floppy drive of FIG. 5a coupled to the drive chassis and third support wall of FIG. 6c in the method of FIG. 6a.

FIG. 6j is a perspective view illustrating an embodiment of the third support wall of FIG. 3a repositioned in the drive chassis of FIG. 2 in the method of FIG. 6a.

FIG. 6k is a perspective view illustrating an embodiment of the third support wall of FIG. 3a recoupled to the drive chassis of FIG. 2 in the method of FIG. 6a.

FIG. 6l is a perspective view illustrating an embodiment of a plurality of the optical drives of FIG. 4a and the floppy drive of FIG. 5a coupled to the drive chassis and third support wall of FIG. 6k in the method of FIG. 6a.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

Figure 1:
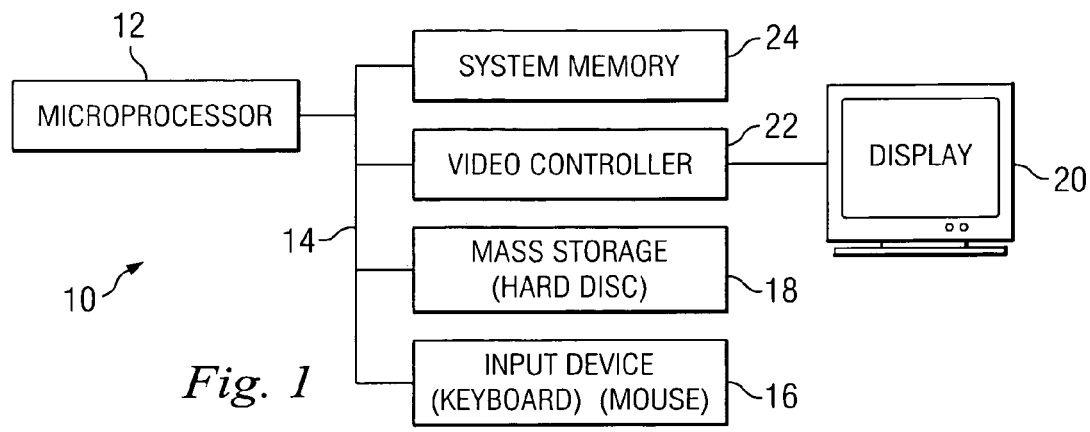
FIG. 1 is a schematic view illustrating an embodiment of an information handling system.

In one embodiment, information handling system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
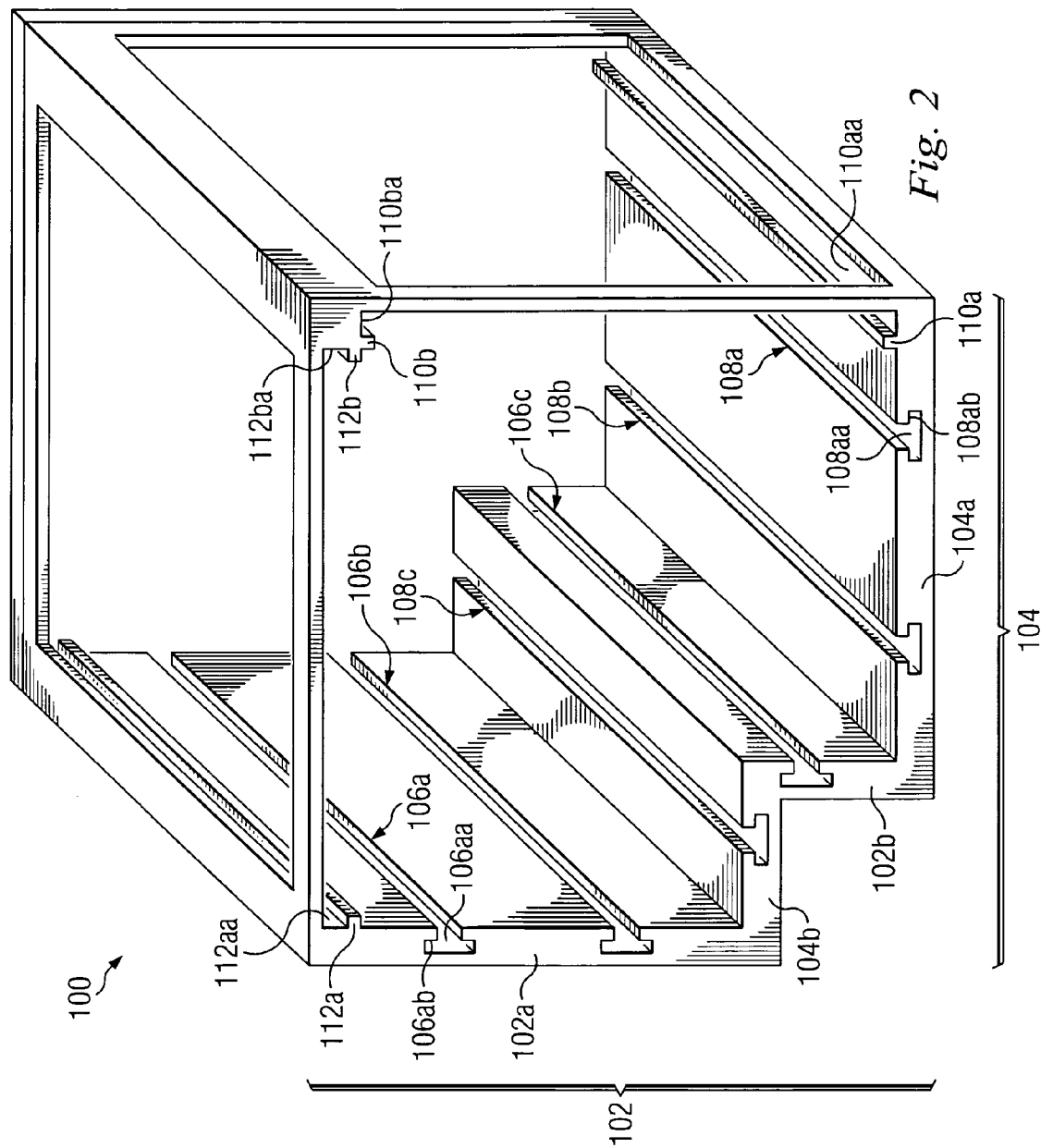
FIG. 2 is a perspective view illustrating an embodiment of a drive chassis.

Referring now to FIG. 2, a drive chassis 100 is illustrated. Drive chassis 100 includes a first support wall 102 having a section 102a and a section 102b which is substantially parallel to section 102a and spaced apart from section 102a. Drive chassis 100 also includes a second support wall 104 which is substantially transverse to the first support wall 102 and includes a section 104a and a section 104b which is substantially parallel to section 104a and spaced apart from section 104a. A plurality of first support structures 106a, 106b, 106c are included on the first support wall 102. First support structure 106a includes a channel 106aa defined by the first support wall 102 and having a varying width such that a securing surface 106ab is located in the channel 106aa. First support structures 106b and 106c are substantially similar to first support structure 106a. A plurality of second support structures 108a, 108b, 108c are included on the second support wall 104. Second support structure 108a includes a channel 108aa defined by the second support wall 104 and having a varying width such that a securing surface 108ab is located in the channel 108aa. Second support structures 108b and 108c are substantially similar to second support structure 108a. A plurality of first coupling members 110a and 110b are positioned opposite the first support wall 102, with first coupling member 110a extending from second support wall 104 to define a first coupling channel 110aa and first coupling member 110b substantially co-planar with and spaced apart from first coupling member 110a and defining a first coupling channel 110ba. A plurality of second coupling members 112a and 112b are positioned opposite the second support wall 104, with second coupling member 112a extending from first support wall 102 to define a second coupling channel 112aa and second coupling member 112b substantially co-planar with and spaced apart from second coupling member 112a and defining a second coupling channel 112ba.

Figure 3A:
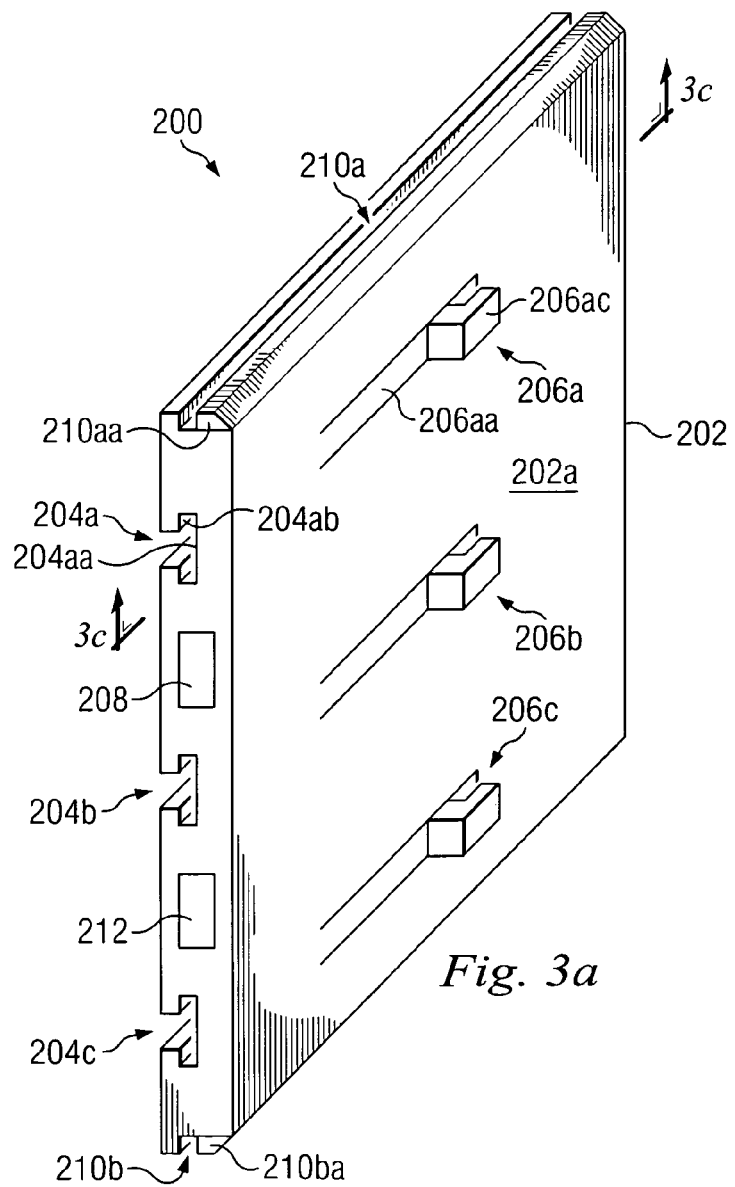
FIG. 3a is a top perspective view illustrating an embodiment of a third support wall used with the drive chassis of FIG. 2.

Referring now to FIGS. 3a, 3b, and 3c, a repositionable third support wall 200 include a base 202 having an outer surface 202a and an inner surface 202b opposite the outer surface 202a. A plurality of third support structures 204a, 204b, and 204c are included on the third support wall 200. Third support structure 204a includes a channel 204aa defined by the base 202 of third support wall 200, positioned adjacent the inner surface 202b, and having a varying width such that a securing surface 204ab is present in the channel 204aa. Third support structures 204b and 204c are substantially similar to third support structure 204a. A plurality of securing members 206a, 206b and 206c are positioned adjacent the outer surface 202a and the third support structures 204a, 204b, and 204c, respectively. Securing member 206a includes a beam member 206aa extending from and along the base 202. Beam member 206aa includes an activation surface 206ab extending into the channel 204aa and a release tab 206ac and securing surface 206ad on its distal end. Securing members 206b and 206c are substantially similar to securing member 206a. A drive release actuator 208 is mounted on the third support wall 200 and is operable to actuate securing members 206a, 206b, and 206c such that the activation surfaces, such as activation surface 206ab, may be moved out of the channels, such as channel 204aa. A plurality of coupling devices 210a and 210b are positioned on opposite sides of the base 202 of third support wall 200. Coupling device 210a includes a retractable coupler 210aa which is operable to retract into the base 202. Coupling device 210b includes a retractable coupler 210ba which is operable to retract into the base 202. A wall release actuator 212 is mounted on the third support wall 200 and is operable to actuate the retractable couplers 210aa and 210ba on coupling devices 210a and 210b, respectively, such that the retractable couplers 210aa and 210ba retract into the base 202.

Figure 4A:
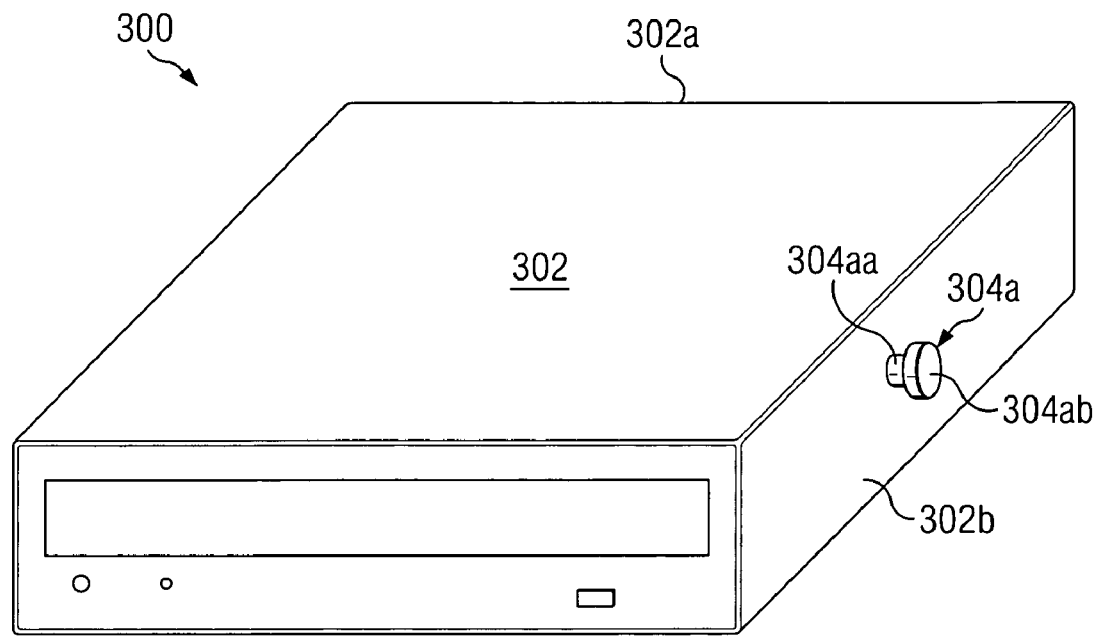
Figure 4B:
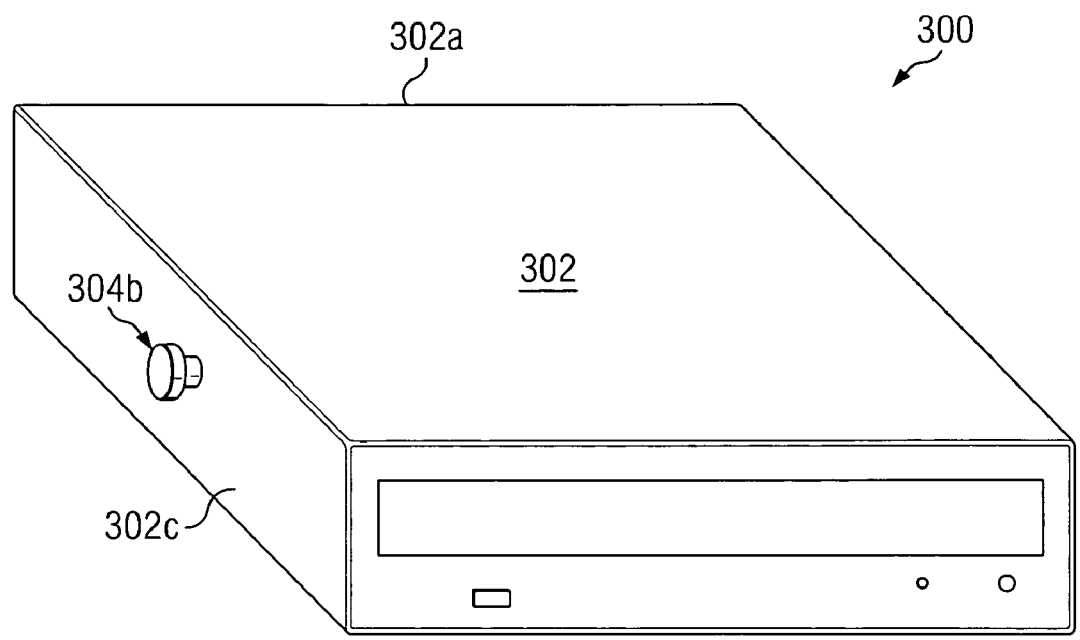

Referring now to FIGS. 4a and 4b, an optical drive 300, which may be the mass storage device 18 described above with reference to FIG. 1, includes a base 302. Base 302 includes a rear surface 302a and a plurality of opposing side surfaces 302b and 302c. A plurality of guide tabs 304a and 304b extend from the sides surfaces 302b and 302c, respectively. Guide tab 304a includes a beam portion 304aa and a head 304ab on its distal end which has a width greater than the width of the beam portion 304aa. Guide tab 304b is substantially similar to guide tab 304a. In an embodiment, the optical drive 300 may be a variety of conventional drives known in the art which are modified to include guide tabs 304a and 304b.

Figure 5A:
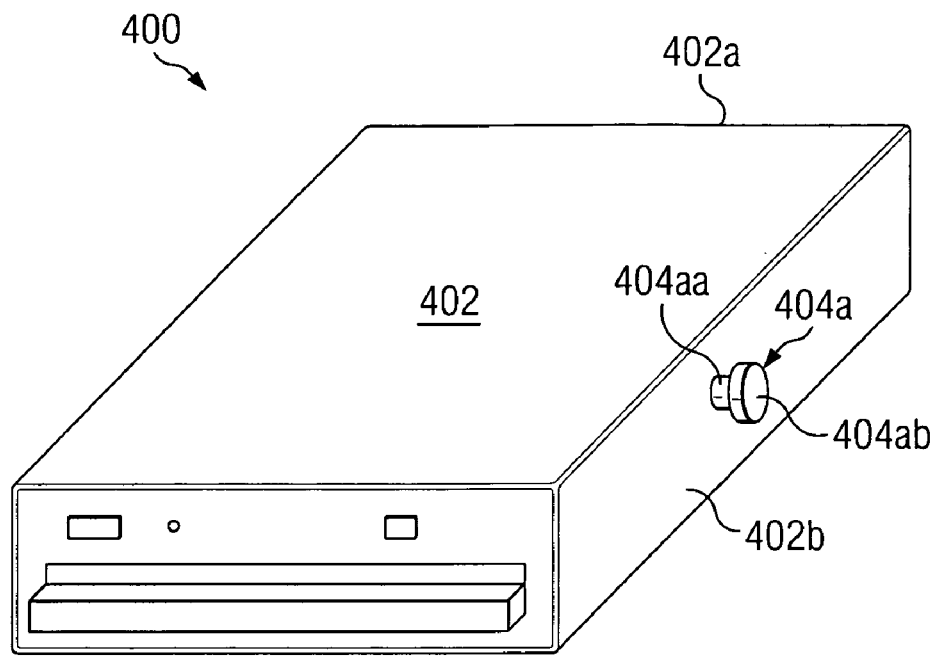
Figure 5B:
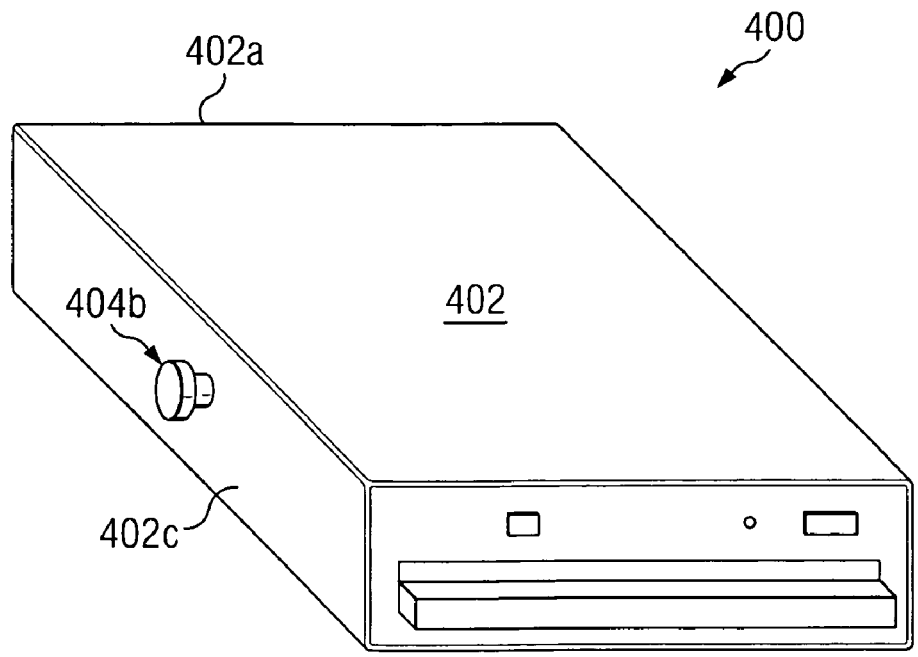
FIG. 5b is a side perspective view illustrating an embodiment of the floppy drive of FIG. 5b.

Referring now to FIGS. 5a and 5b, a floppy drive 400, which may be the mass storage device 18 described above with reference to FIG. 1, includes a base 402. Base 402 includes a rear surface 402a and a plurality of opposing side surfaces 402b and 402c. A plurality of guide tabs 404a and 404b extend from the sides surfaces 402b and 402c, respectively. Guide tab 404a includes a beam portion 404aa and a head 404ab on its distal end which has a width greater than the width of the beam portion 404aa. Guide tab 404b is substantially similar to guide tab 404a. In an embodiment, the floppy drive 400 may be a variety of conventional drives known in the art which are modified to include guide tabs 404a and 404b.

Figure 6A:
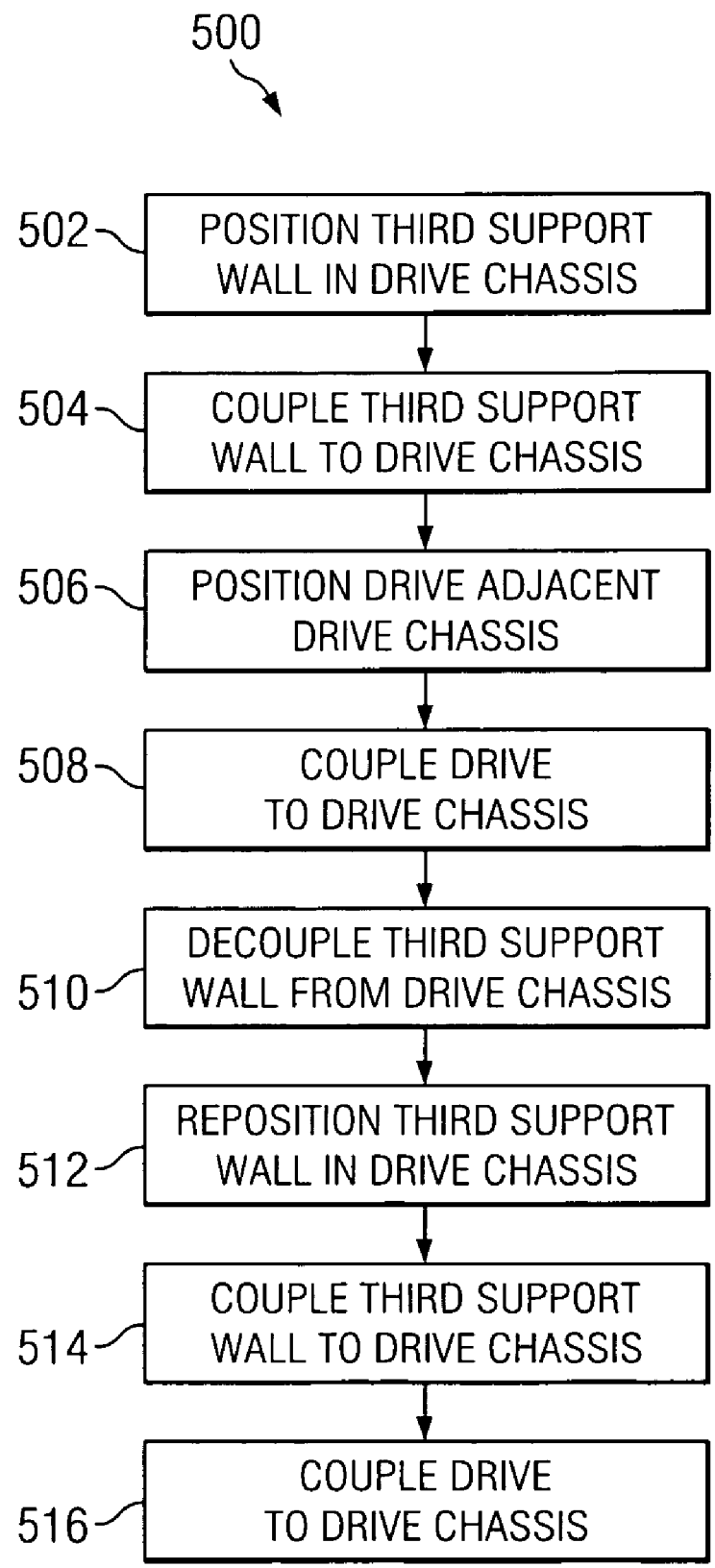
FIG. 6a is a flow chart illustrating an embodiment of a method for mounting a drive in a chassis.
Figure 6B:
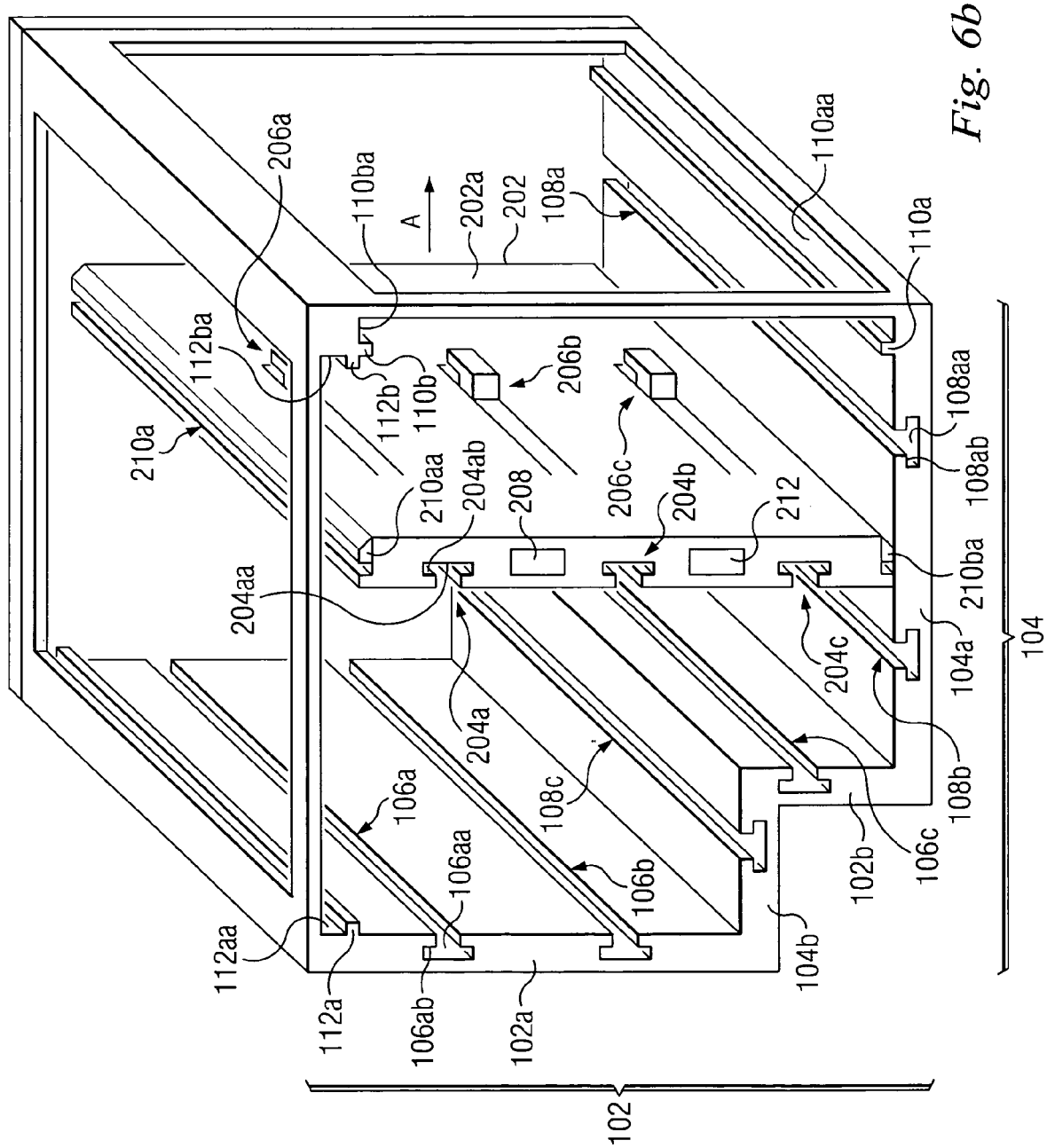

Referring now to FIGS. 6a and 6b, in operation, a method 500 for mounting a drive in a chassis begins at step 502 where the third support wall 200 is positioned in the drive chassis 100. Third support wall 200 is placed in the drive chassis 100 such that third support wall 200 is substantially parallel to first support wall 102 and substantially transverse to second support wall 104, with third support structures 204a, 204b, and 204c facing first support structures 106a, 106b, and 106c, respectively.

Referring now to FIGS. 3a, 6a, 6b, and 6c, the method 500 proceeds to step 504 where the third support wall 200 is coupled to the drive chassis 100. The third support wall 200 is moved in a direction A which is substantially perpendicular to the first support wall 102 and substantially parallel to the second support wall 104. As third support wall 200 is moved in the direction A, retractable couplers 210aa and 210ba on coupling devices 210a and 210b, respectively, are brought into engagement with first coupling members 110a and 110b on drive chassis 100. Further movement of third support wall 200 in direction A causes the retractable couplers 210aa and 210ba on coupling devices 210a and 210b, respectively, to first retract into base 202, pass first coupling members 110a and 110b, and then extend out from base 202 and into first coupling channels 110aa and 110ba. With retractable couplers 210aa and 210ba extended out into first coupling channels 110aa and 110ba, third support wall 200 is coupled to the drive chassis 100 and held in place in a first position X by first coupling members 110a and 110b. With third support wall 200 coupled to drive chassis 100, third support structure 204a is substantially aligned with first support structure 106a, third support structure 204b is substantially aligned with first support structure 106b, and third support structure 204c is substantially aligned with first support structure 106c.

Referring now to FIGS. 4b, 6a, 6c, and 6d, the method 500 proceeds to step 506 where the drive 300 is positioned adjacent the drive chassis 100. Drive 300 is positioned in front of the drive chassis 100 such that the rear surface 302a of drive 300 may enter drive chassis 100 initially, with side surface 302c adjacent first support wall 102 and side surface 302b adjacent third support wall 200. Guide tab 304a is lined up to enter channel 204aa on third support structure 204a and guide tab 304b is lined up to enter channel 106aa on first support structure 106a.

Figure 6C:
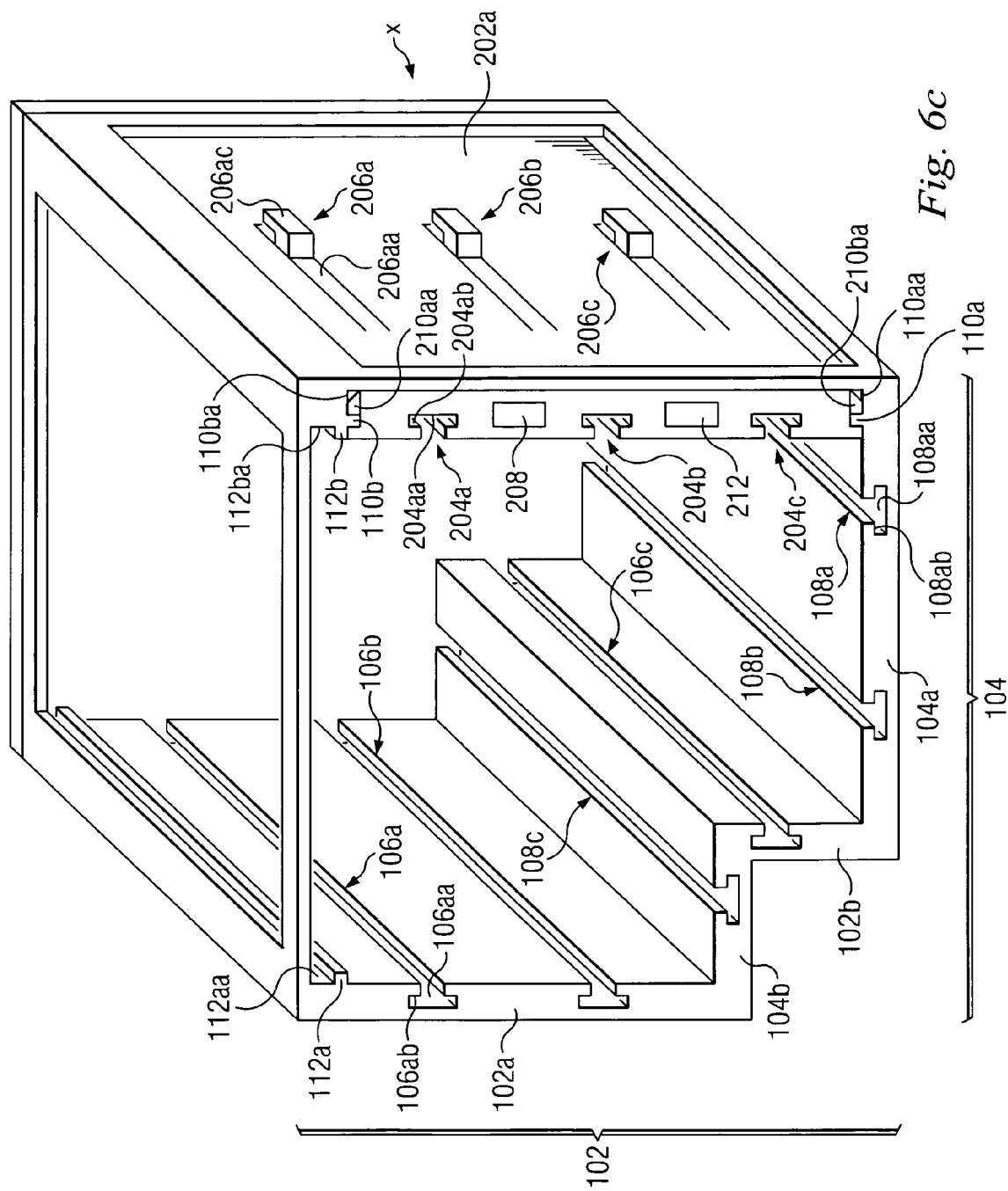
Figure 6E:
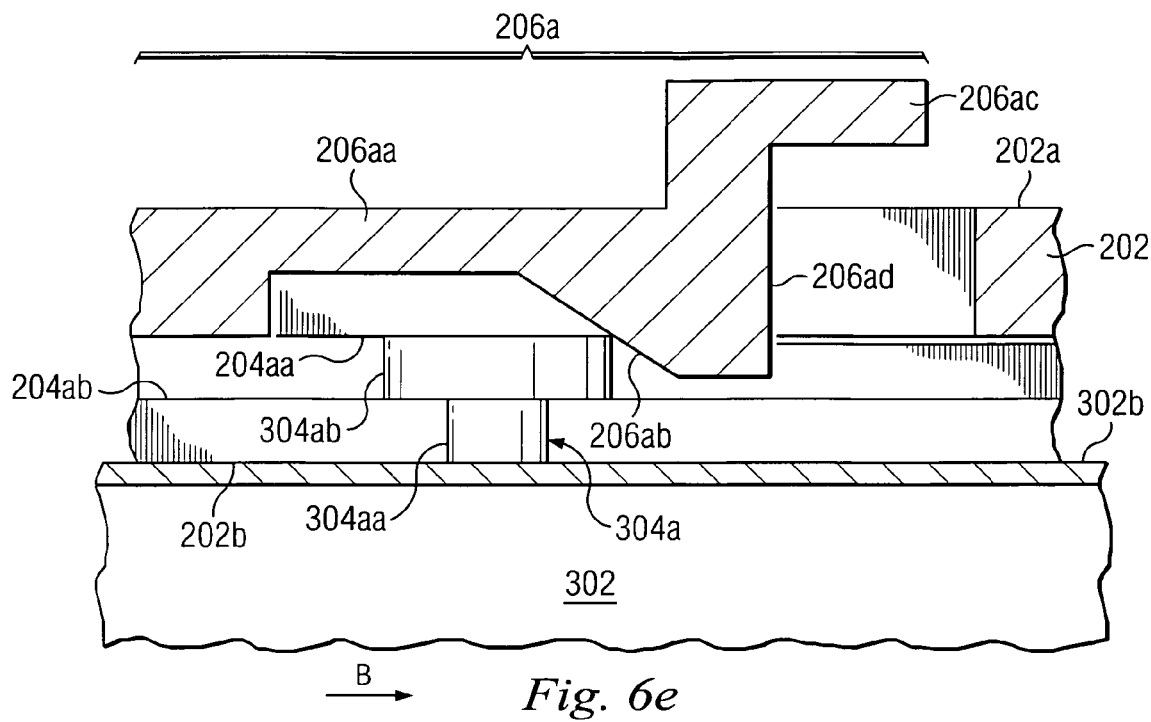
Figure 6F:
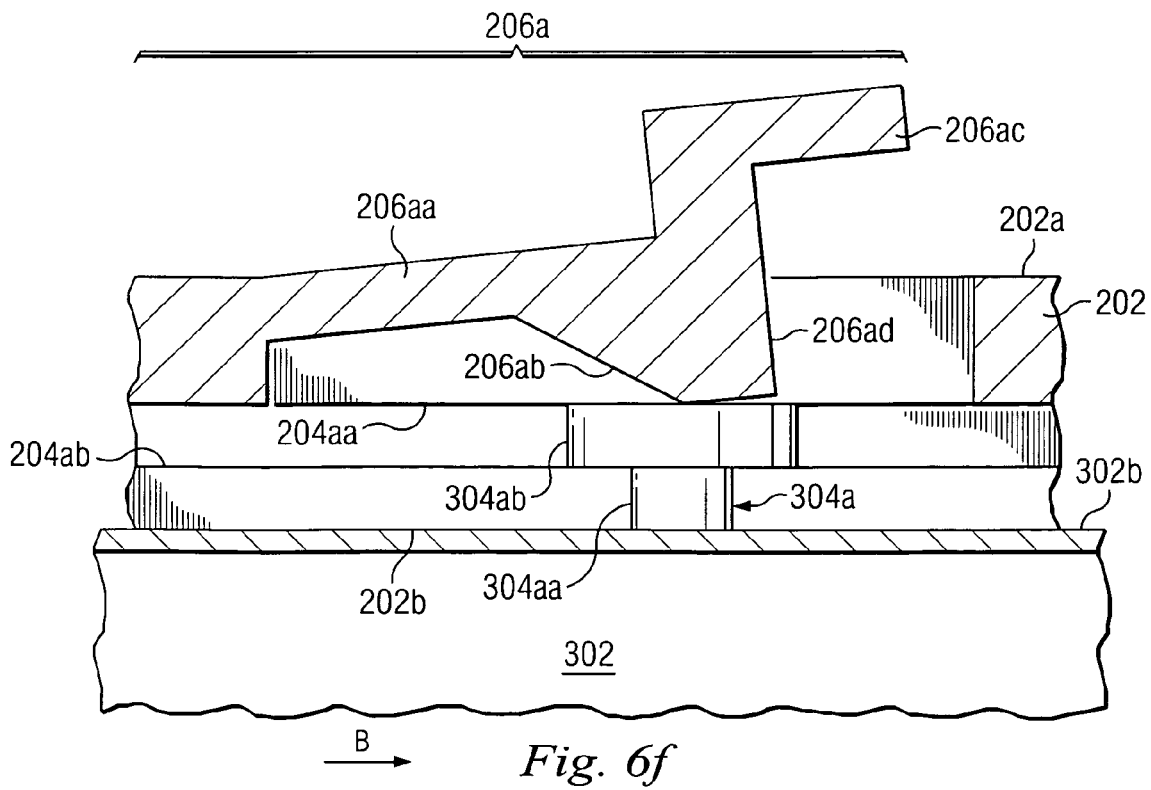
Figure 6G:
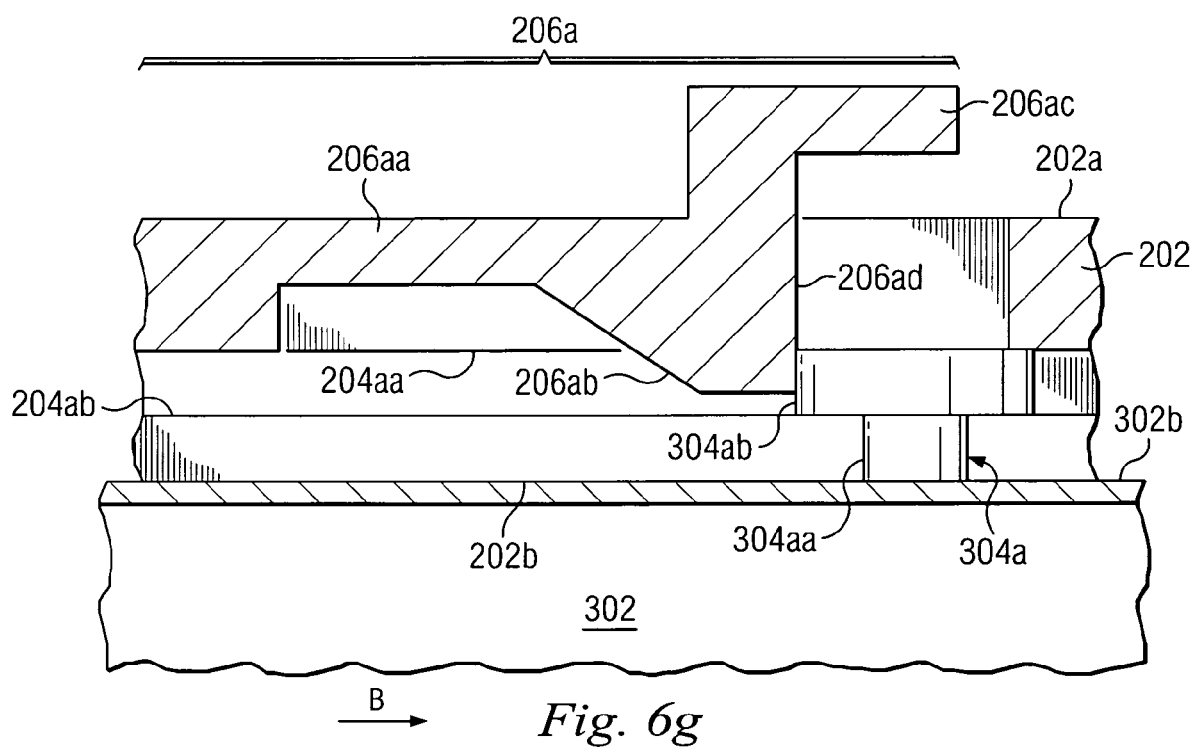
Figure 6H:
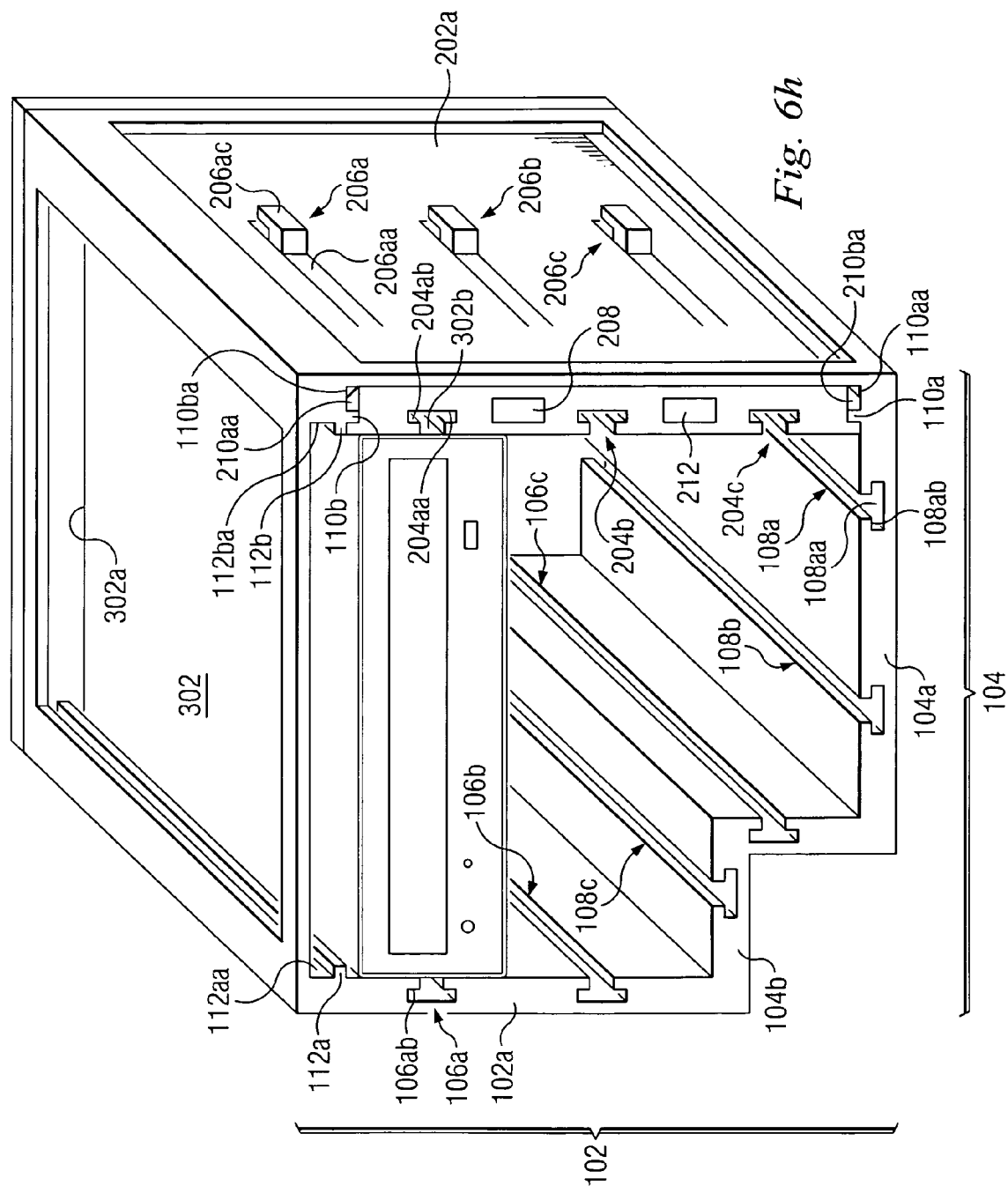

Referring now to FIGS. 4b, 6a, 6d, 6e, 6f, 6g, and 6h, the method 500 proceeds to step 508 where the drive 300 is coupled to the drive chassis 100. Drive 300 is moved in a direction B, which is substantially parallel to both the first support wall 102 and the second support wall 104. As drive 300 is moved in the direction B, guide tabs 304a and 304b enter channels 204aa and 106aa, respectively, with securing surface 106ab holding the head of guide tab 304b in channel 106aa and securing surface 204ab holding the head 304ab of guide tab 304a in channel 204aa. As guide tab 304a is moved in direction B through channel 204aa on third support structure 204a, head 304ab on guide tab 304a engages activation surface 206ab on securing member 206a. Activation surface 206ab allows guide tab 304a to deflect beam member 206aa on securing member 106a such that head 304ab on guide tab 304a may continue in direction B through the channel 204aa. Drive 300 is coupled and secured to the drive chassis 100 when head 304ab on guide tab 304a moves past securing member 206a such that beam member 206aa is allowed to deflect back to its original position and securing surface 206ad engages head 304ab, as illustrated in FIGS. 6g and 6h. The drive 300 may be decoupled from the drive chassis 100 by activating the drive release actuator 208 or the release tab 206ac to deflect the beam member 206aa such that securing surface 206ad is removed from channel 204aa, as illustrated in FIG. 6f. The drive 300 may then be moved in a direction opposite the direction B and out of the drive chassis 100.

Figure 6I:
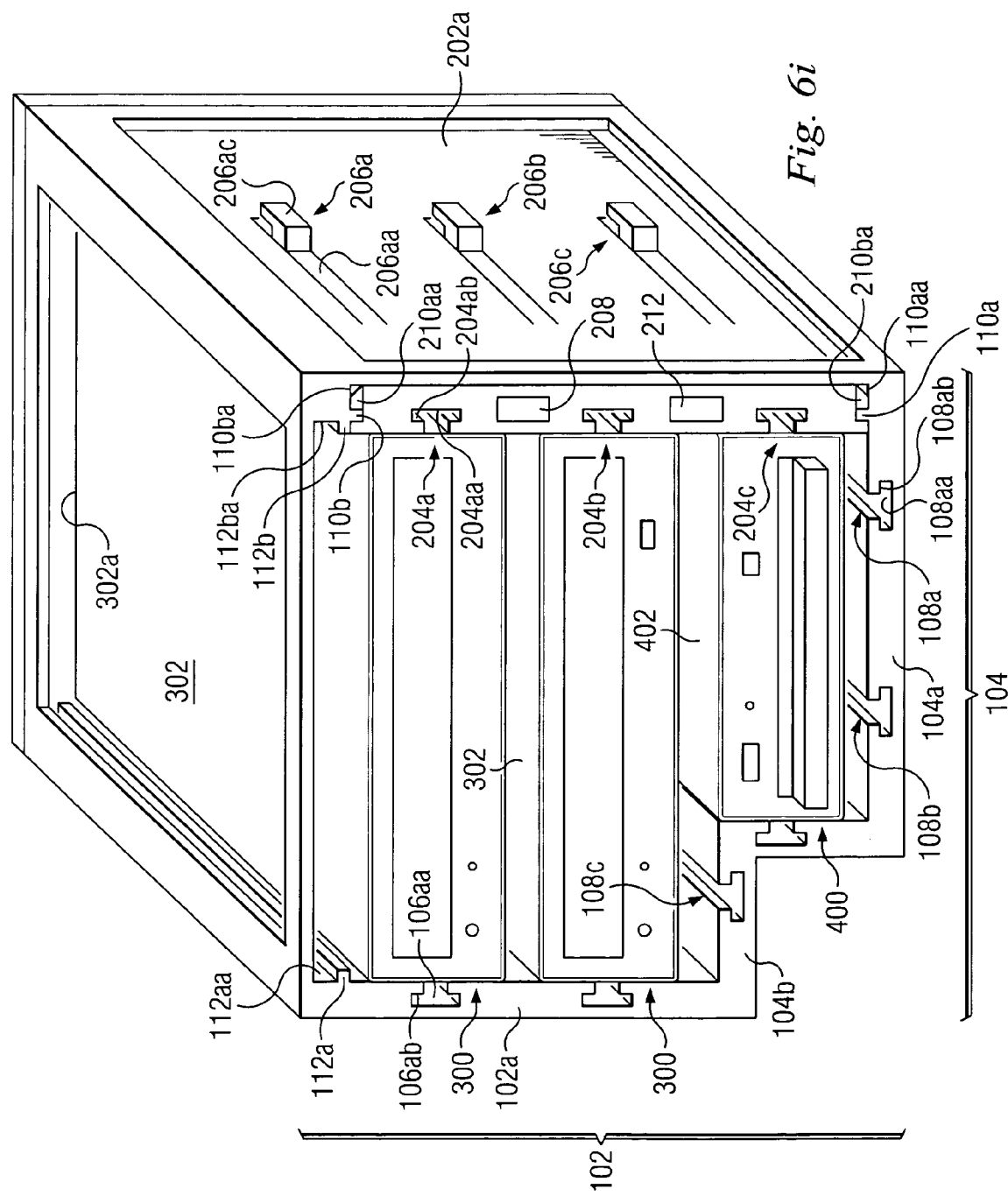

Referring now to FIG. 6i, in an embodiment, a plurality of drives such as, for example, a pair of the drives 300 and the drive 400, may be coupled to and decoupled from the drive chassis 100 in substantially the same manner as described above with reference to FIGS. 6d, 6e, 6f, 6g, and 6h. In an embodiment, a plurality of securing members may be provide on first support wall 102 which are substantially similar in design and operation to the securing members 206a, 206b, and 206c on third support wall 200.

Referring now to FIGS. 6a, 6b, and 6c, the method 500 proceeds to step 510 where the third support wall 200 is decoupled from the drive chassis 100. Drives such as, for example, drives 300 and 400, are removed from the drive chassis 100 as described above. The third support wall 200 may then be decoupled from the drive chassis 100 by activating the wall release actuator 212, which causes the retractable couplers 210aa and 210ba on coupling devices 210a and 210b, respectively, to retract out of channels 110aa and 110ba, respectively, and into the base 202. The third support wall 200 is now released from first coupling members 110a and 110b and may be moved in a direction opposite the direction A and then removed out of the drive chassis 100.

Figure 6J:
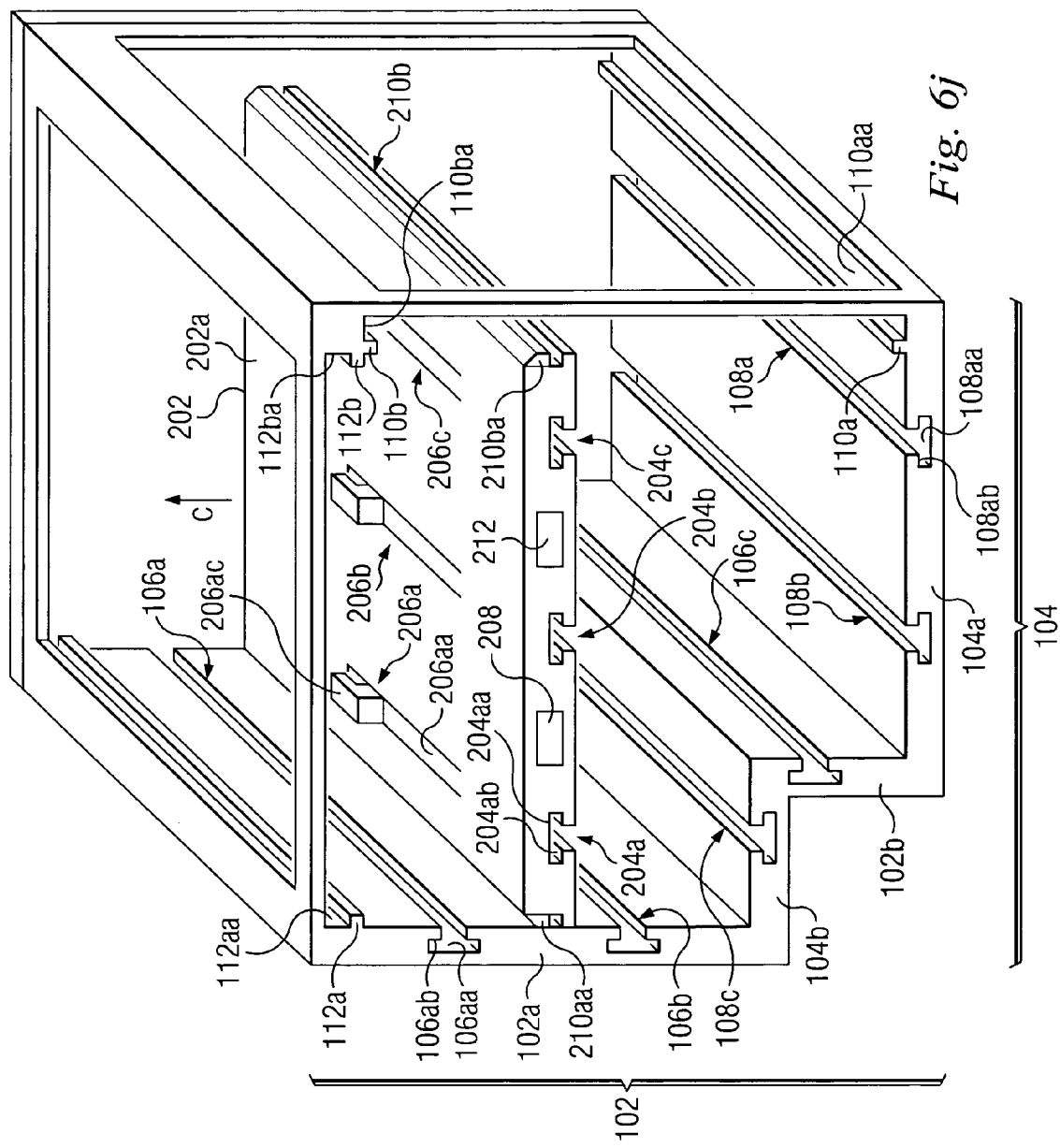
Figure 6K:
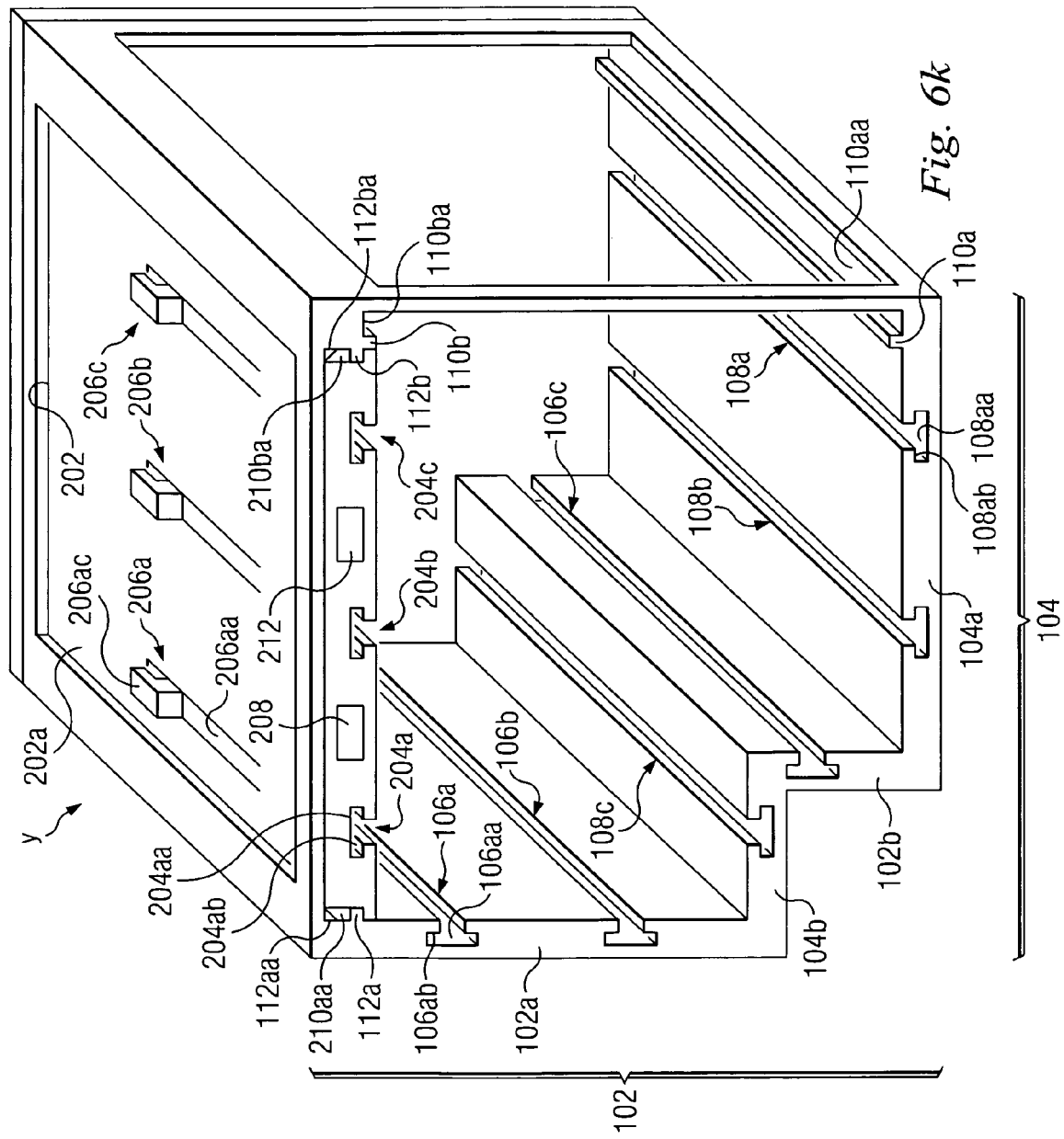

Referring now to FIGS. 6a and 6j, the method 500 proceeds to step 512 where the third support wall 200 is repositioned in the drive chassis 100. Third support wall 200 is placed in the drive chassis 100 such that third support wall 200 is substantially parallel to second support wall 104 and substantially transverse to first support wall 102, with third support structures 204a, 204b, and 204c facing second support structures 108c, 108b, and 108a, respectively.

Referring now to FIGS. 3a, 6a, 6j, and 6k, the method 500 proceeds to step 514 where the third support wall 200 is coupled to the drive chassis 100. The third support wall 200 is moved in a direction C which is substantially perpendicular to the second support wall 104 and substantially parallel to the first support wall 102. As third support wall 200 is moved in the direction C, retractable couplers 210aa and 210ba on coupling devices 210a and 210b, respectively, are brought into engagement with second coupling members 112a and 112b on drive chassis 100. Further movement of third support wall 200 in direction C causes the retractable couplers 210aa and 210ba on coupling devices 210a and 210b, respectively, to first retract into base 202, pass second coupling members 112a and 112b, and then extend out from base 202 and into second coupling channels 112aa and 112ba. With retractable couplers 210aa and 210ba extended out into second coupling channels 112aa and 112ba, third support wall 200 is coupled to the drive chassis 100 and held in place in a second position Y by second coupling members 112a and 112b. With third support wall 200 coupled to drive chassis 100, third support structure 204a is substantially aligned with second support structure 108c, third support structure 204b is substantially aligned with second support structure 108b, and third support structure 204c is substantially aligned with second support structure 108a.

Figure 6L:
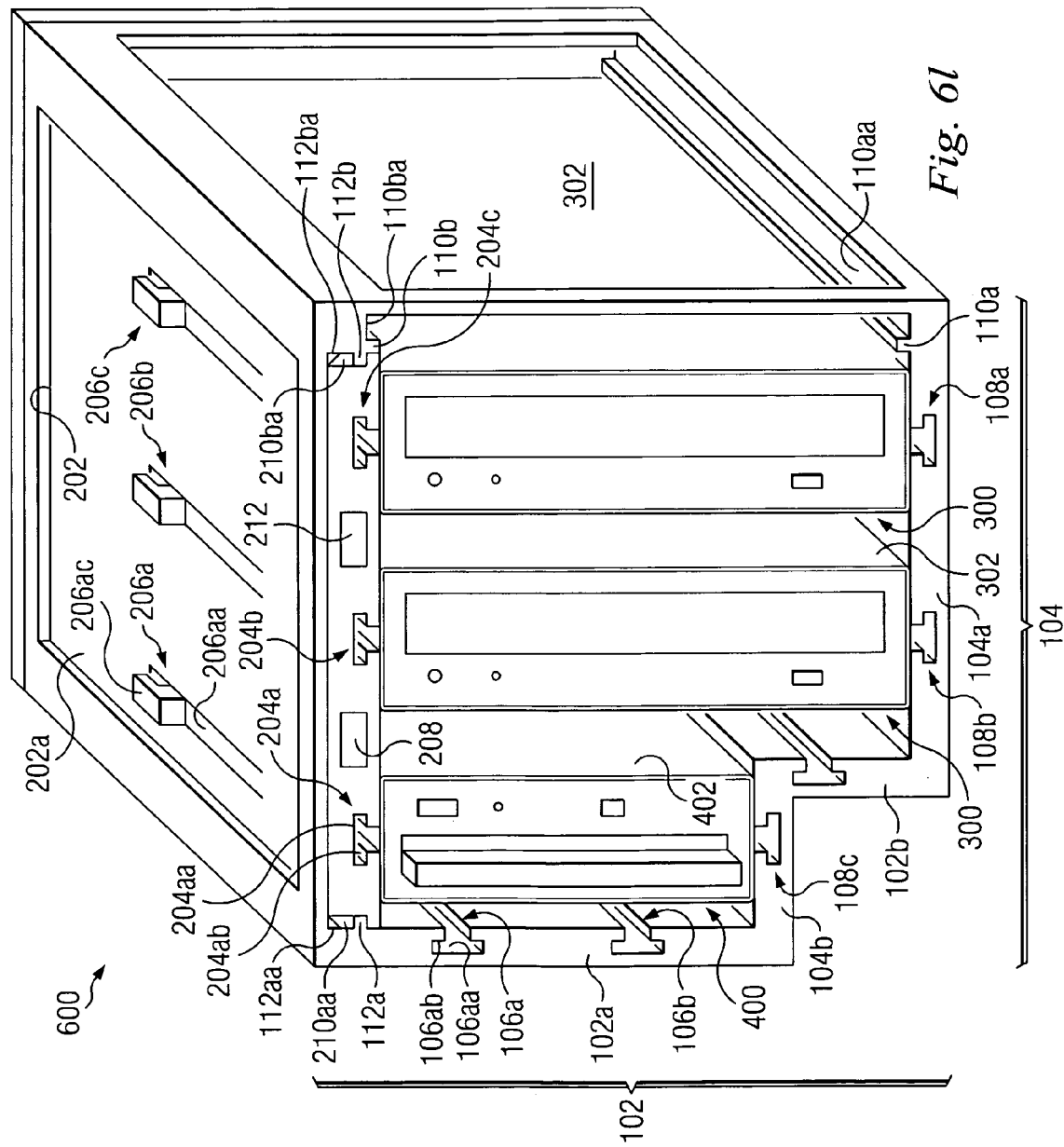

Referring now to FIGS. 6a and 6l, the method 500 proceeds to step 516 where the drive 300 is coupled to the drive chassis 100. Drive 300 may be coupled and decoupled to the support structures 204c and 108a on third support wall 200 and second support wall 104, respectively, in substantially the same manner as drive 300 was coupled to the support structures 204a and 106a on third support wall 200 and first support wall 102, respectively, as described above with reference to FIGS. 6d, 6e, 6f, 6g, and 6h. In an embodiment, a plurality of drives such as, for example, a pair of the drives 300 and the drive 400, may be coupled to and decoupled from the drive chassis 100 in substantially the same manner as described above with reference to FIGS. 6d, 6e, 6f, 6g, and 6h. In an embodiment, a plurality of securing members may be provide on second support wall 104 which are substantially similar in design and operation to the securing members 206a, 206b, and 206c on third support wall 200. In an embodiment, the drive chassis 100 and the third support wall 200 provide a drive mounting apparatus 600 which may also include one or both of drives 300 and/or the drive 400.

Figure 7A:
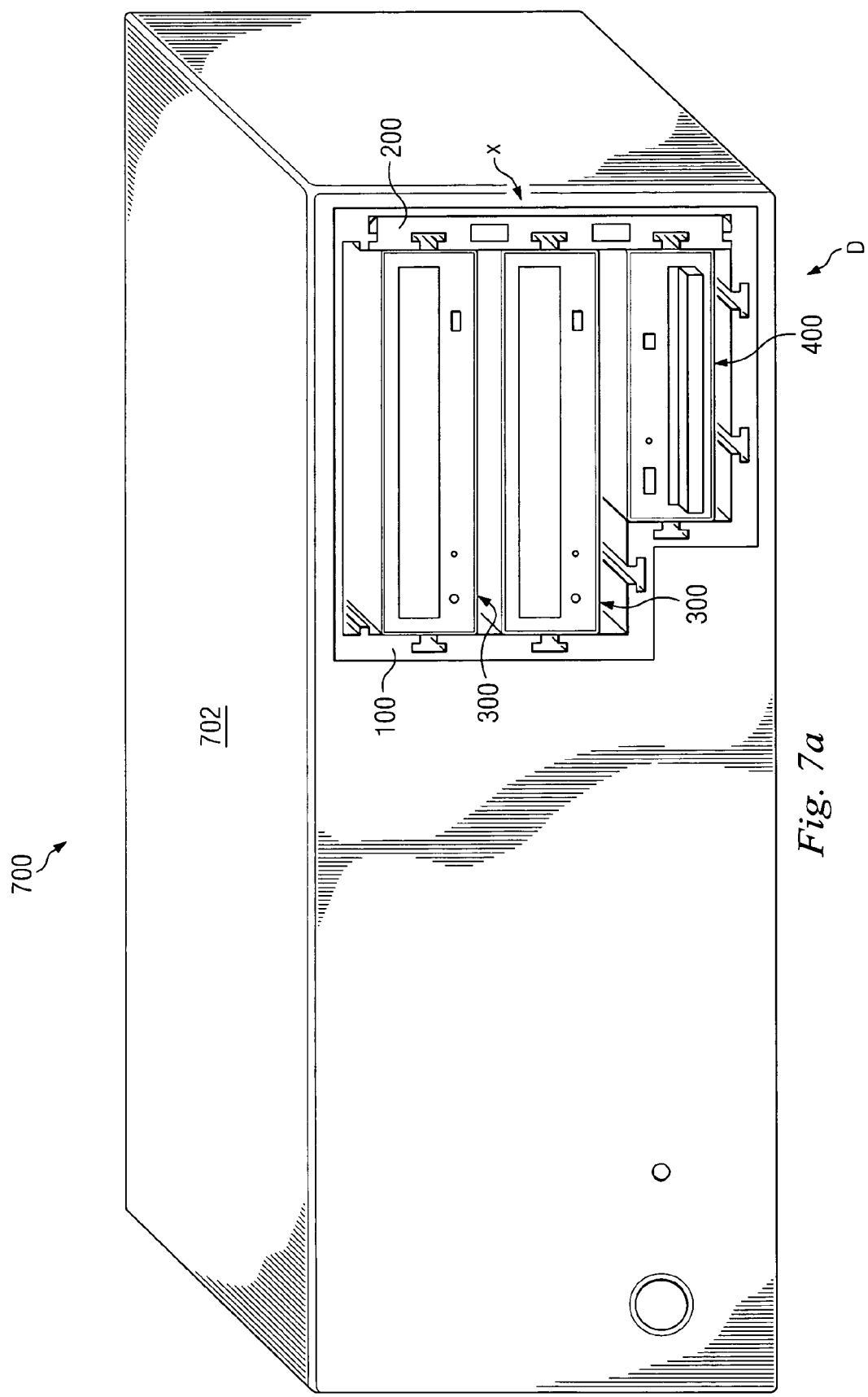
FIG. 7a is a perspective view illustrating an embodiment of the drive chassis of FIG. 2, the third support wall of FIG. 3a, and the drives of FIGS. 4a and 5a in a system chassis in a horizontal position.
Figure 7B:
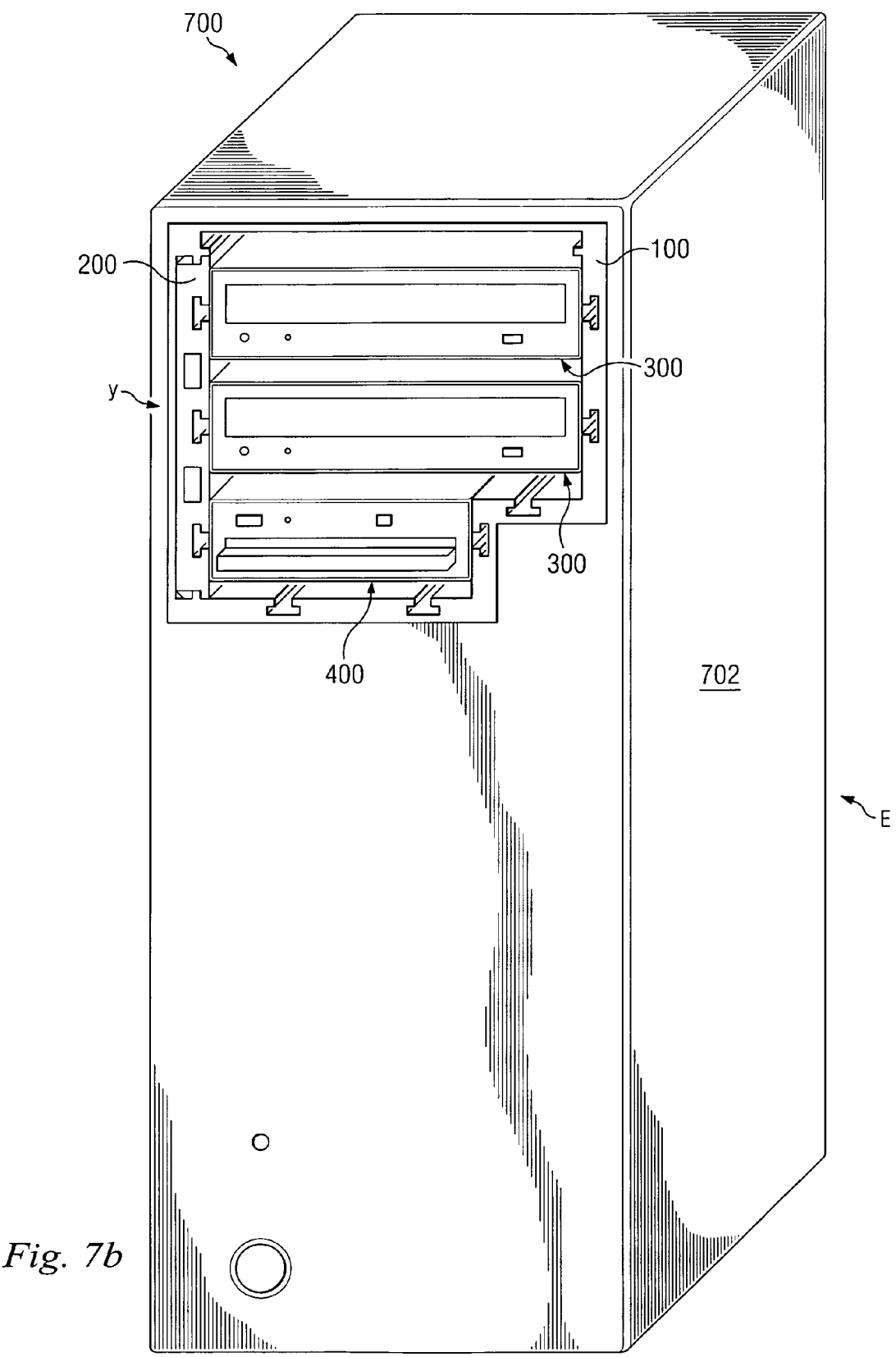
FIG. 7b is a perspective view illustrating an embodiment of the drive chassis of FIG. 2, the third support wall of FIG. 3a, and the drives of FIGS. 4a and 5a in a system chassis in a vertical position.

Referring now to FIGS. 7a and 7b, an alternative embodiment of a drive mounting apparatus 700 is substantially identical in design and operation to the drive mounting apparatus described above with reference to FIGS. 1, 2, 3a, 3b, 3c, 4a, 4b, 5a, 5b, 6a, 6b, 6c, 6d, 6e, 6f, 6g, 6h, 6i, 6j, 6k, and 6l, with the addition of a system chassis 702 which is operable to be positioned in a horizontal position D or a vertical position E. In an embodiment, the system chassis 702 may house some or all of the component of an information handling system such as, for example, the information handling system 10 described above with reference to FIG. 1. In operation, with the system chassis 702 in the horizontal position D, drives such as, for example, the plurality of the drives 300 and the drive 400, may be positioned horizontally with the third support wall 200 in position X. The system chassis 702 may then be repositioned to the vertical position E, and the drives 300 and 400 may be positioned horizontally with the third support wall 200 in position Y.

It is understood that variations may be made in the foregoing without departing from the scope of the disclosed embodiments. Furthermore, the elements and teachings of the various illustrative embodiments may be combined in whole or in part some or all of the illustrated embodiments.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A drive mounting apparatus comprising:
   a drive chassis;
   a first support wall on the drive chassis including a first support structure;
   a second support wall on the drive chassis substantially transverse to the first support wall and including a second support structure; and
   a repositionable third support wall including a third support structure and operable to be coupled to the drive chassis in a first position opposite the first support wall to provide support between the first support structure and the third support structure, whereby the third support wall is operable to be repositioned on the drive chassis and coupled to the drive chassis in a second position opposite the second support wall to provide support between the second support structure and the third support structure.

2. The apparatus of claim 1 wherein the first support wall includes a plurality of first support structures.

3. The apparatus of claim 1 wherein the first support structure includes a channel defined by the first support wall.

4. The apparatus of claim 1 wherein the second support wall includes a plurality of second support structures.

5. The apparatus of claim 1 wherein the second support structure includes a channel defined by the second support wall.

6. The apparatus of claim 1 wherein the third support wall includes a plurality of third support structures.

7. The apparatus of claim 1 wherein the third support structure includes a channel defined by the third support wall.

8. The apparatus of claim 1 wherein the third support structure includes a drive securing member.

9. The apparatus of claim 1 further comprising:
   a drive supported in the drive chassis by the first support structure and the third support structure when the third support wall is in the first position, whereby the drive may be reconfigured by substantially ninety degrees in the drive chassis and supported by the second support structure and the third support structure when the third support wall is in the second position.

10. An information handling system comprising
    a system chassis operable to be positioned in one of a horizontal and a vertical position;
    a drive chassis coupled to the system chassis;
    a first support wall on the drive chassis including a first support structure;
    a second support wall on the drive chassis substantially transverse to the first support wall and including a second support structure; and
    a repositionable third support wall including a third support structure and operable to be coupled to the drive chassis in a first position opposite the first support wall to provide support between the first support structure and the third support structure, whereby the third support wall is operable to be repositioned on the drive chassis and coupled to the drive chassis in a second position opposite the second support wall to provide support between the second support structure and the third support structure.

11. The system of claim 10 wherein the first support wall includes a plurality of first support structures.

12. The system of claim 10 wherein the first support structure includes a channel defined by the first support wall.

13. The system of claim 10 wherein the second support wall includes a plurality of second support structures.

14. The system of claim 10 wherein the second support structure includes a channel defined by the second support wall.

15. The system of claim 10 wherein the third support wall includes a plurality of third support structures.

16. The system of claim 10 wherein the third support structure includes a channel defined by the third support wall.

17. The system of claim 10 wherein the third support structure includes a drive securing member.

18. The system of claim 10 further comprising:
a drive supported in the drive chassis by the first support structure and the third support structure when the system chassis is in the horizontal position and the third support wall is in the first position, whereby the drive may be reconfigured by substantially ninety degrees in the drive chassis and supported by the second support structure and the third support structure when the system chassis is in the vertical position and the third support wall is in the second position.

19. A method for mounting a drive in a chassis comprising:
providing a system chassis operable to be positioned in one of a horizontal position and a vertical position;
coupling a drive chassis to the system chassis, the drive chassis including a first support wall having a first support structure and a second support wall having a second support structure, the second support wall being substantially transverse to the first support wall;
removeably coupling a third support wall to the drive chassis, the third support wall positioned opposite the first support wall and including a third support structure;
positioning the system chassis in the horizontal position; and
supporting a drive between the first support structure and the third support structure.

20. The method of claim 19 further comprising:
securing the drive in the drive chassis.

21. The method of claim 19 further comprising:
removing the drive from the drive chassis;
repositioning the system chassis in the vertical position;
decoupling the third support wall from the drive chassis;
coupling the third support wall to the drive chassis, the third support wall positioned opposite the second support wall; and
supporting the drive between the second support structure and the third support structure.

22. The method of claim 21 further comprising:
securing the drive in the drive chassis.

23. A vertical and horizontal drive mounting system comprising:
a chassis;
a wall member movably mounted in the chassis in multiple positions and first and second orientations;
a variety of drive units being mounted in the chassis in the first orientation in response to the wall member being mounted in the first orientation; and
the variety of drive units being mounted in the chassis in the second orientation in response to the wall member being mounted in the second orientation.

* * * * *